Aug. 30, 1960

T. A. WHITE 2,950,903

ROTARY DRILLING BIT

Filed Aug. 6, 1958

INVENTOR
Thomas A. White

BY

ATTORNEY

United States Patent Office 2,950,903
Patented Aug. 30, 1960

2,950,903

ROTARY DRILLING BIT

Thomas A. White, P.O. Box 27, Quanah, Tex.

Filed Aug. 6, 1958, Ser. No. 753,541

1 Claim. (Cl. 255—61)

This invention relates to rotary drilling bits for drilling oil and water wells, and it concerns more particularly a bit having multiple blades capable of being detached from the body for replacement or reconditioning.

This application is a continuation in part of my co-pending application, Serial No. 597,426, filed July 12, 1956, which has now matured into Patent No. 2,861,779, dated November 25, 1958.

In my application above referred to I have described and claimed a novel construction of both body and blades whereby the blades are securely connected to the body.

The drilling bit described in my co-pending application has a body member formed with a threaded pin for connecting it to a drill stem. An annular shoulder is formed on the body member about the pin. The body member has a plurality of circumferentially spaced longitudinal grooves therein opening at their upper ends in the shoulder. A recess is formed in the shoulder on one side of each of the grooves. A cutter blade is seated in each of the grooves. The cutter blades each have a curved head portion segmentally embracing the pin, and means on the head portion seated in the adjacent recess. A beveled surface formed on each of the head portions is inclined downwardly from the pin and engageable by the correspondingly tapered surface of a drill stem threaded on the pin.

An object of this invention is to provide an improved blade which is peculiarly adapted for use in the bit structure shown in my co-pending application, and which is characterized by its superior cutting efficiency as well as its resistance to wear.

Another object of the invention is to provide, in a rotary drilling bit having a body, a plurality of circumferentially spaced blades removably connected to the body and extending radially outwardly therefrom, the lower ends of the blades extending downwardly and radially inwardly below the body, the blades each having a planar face on its leading side, as determined by the direction of rotation of the bit, aligned with the longitudinal axis of the body, the trailing side of the blade being generally parallel to its leading side, the blades each having straight, vertically disposed inner and outer edges for at least a portion of its length, beginning at its lower end, the trailing side of the blade being continuous with said inner and outer edge portions, the lower end of each blade having a series of radially and longitudinally offset portions, each having a straight, horizontally disposed lower edge, whereby the blade is progressively shortened and widened, stepwise, beginning at its inner edge, the trailing side of the blade being continuous with said lower edge portions.

Another object of the invention is to provide a bit structure as described in which the blades each have a plurality of hardened metal inserts secured in recesses provided therefor in the leading edges of its offset end portions and constituting its cutting surfaces.

The invention will be readily understood by referring to the following description and the accompanying drawing, in which.

Figure 1:
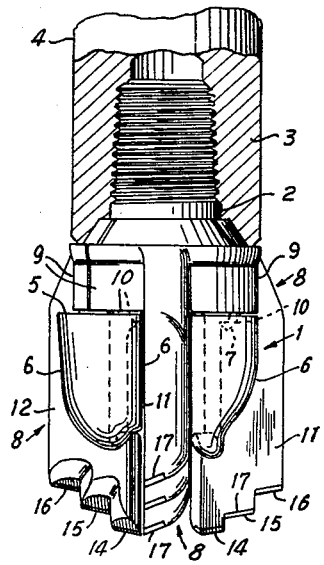
Figure 1 is a side elevational view of a bit embodying the invention.
Figure 2:
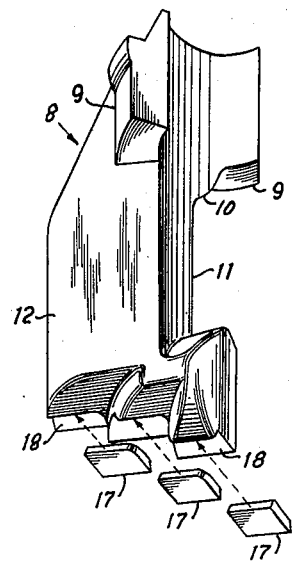
Figure 2 is an exploded perspective view of one of the blades, showing the hardened metal inserts in detached positions before securing them to the blade.
Figure 4:
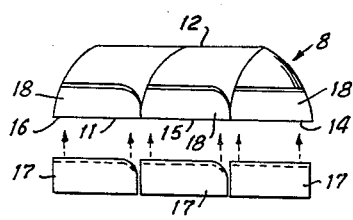
Figure 4 is a fragmentary bottom plan view of one of the blades, showing the inserts in detached positions.
Figure 5:
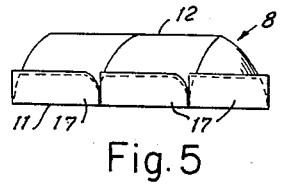
Figure 5 is a view similar to Figure 4, showing the inserts in their assembled positions.
Figure 3:
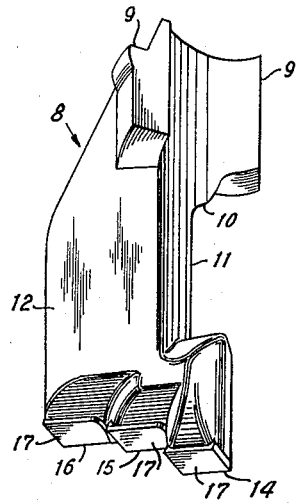
Figure 3 is a view similar to Figure 2, showing the inserts in their assembled positions.
Figure 6:
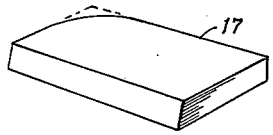
Figure 6 is a perspective view of one of the inserts.

Referring to the drawing, the drilling bit of the invention includes a body, which is designated generally by the numeral 1. The body 1 has a threaded pin 2 formed integrally therewith for attachment of the bit to an internally threaded box 3 on the lower end of a drill stem or sub 4.

The body 1 has a flat annular shoulder 5 formed about the base of the pin 2, and has a plurality of circumferentially spaced longitudinal grooves 6 therein. The grooves 6 open at their upper ends in the shoulder 5. Each of the grooves 6 has an inclined recess 7 on one side extending into the shoulder 5, the recesses 7 being wedge-shaped and having their wider sides opening into the side walls of the grooves 6, for use as hereinafter described.

A plurality of circumferentially spaced blades 8 are removably connected to the body 1, as hereinafter described, and extend radially outwardly therefrom. The lower ends of the blades 8 extend downwardly and radially inwardly below the body 1.

One of the blades 8 is received in each of the longitudinal grooves 6. The blades 8 have arcuate head portions 9 which collectively embrace the pin 2.

The arcuate head portions 9 of the blades 8 have flat under sides and are supported on the annular shoulder 5. The upper edges of the head portions 9 are beveled externally for engagement with the internally beveled lower end of the drill stem or sub 4. The arrangement is such that upon securing the pin 2 in the box 3 of the drill stem or sub 4, the blades 8 are clamped to the body 1 by engagement of the shoulder 5 with the under sides of the head portions 9 and by engagement of the beveled lower end of the drill stem or sub 4 with the beveled upper edges of the head portions 9.

Wedge shaped, triangular webs 10, which are formed on the blades 8 below the head portions 9, are received in the recesses 7 whereby the blades 8 are firmly secured in the grooves 6.

The blades 8 each have a planar face on its leading side 11, as determined by the direction of rotation of the bit, aligned with the longitudinal axis of the body 1. The trailing side 12 of the blade 8 is generally parallel to its leading side 11.

The blades 8 each have straight, vertically disposed inner and outer edges for at least a portion of its length, beginning at its lower end. The trailing side 12 of the blade 8 is continuous with said inner and outer edge portions.

The lower end of each blade 8 has a series of radially and longitudinally offset portions, numbered 14, 15 and 16, respectively, each having a straight, horizontally disposed lower edge, whereby the blade 8 is progressively shortened and widened, stepwise, beginning at its inner edge. The trailing side 12 of the blade 8 is continuous with said lower edge portions.

The blades 8 each have a plurality of hardened metal inserts 17 secured in recesses 18 provided therefor in the leading edges of its offset end portions 14, 15 and 16, respectively, and constituting its cutting surfaces.

The invention may be modified in various ways without departing from the spirit and scope thereof.

What is claimed is:

A rotary drilling bit for use in drilling wells comprising a body member having an integral threaded pin for connection to a drill stem, a shoulder on the body member about the pin, a plurality of circumferentially spaced longitudinal grooves in the body member opening at their upper ends in the shoulder, and a recess on one side of each of the grooves extending into the shoulder, and a plurality of circumferentially spaced cutting blades removably connected to the body member and extending radially outwardly therefrom, the lower ends of the blades extending downwardly and radially inwardly below the body member, the blades each being received in one of the grooves and having an arcuate head portion supported on the shoulder and a web on the head portion engaging the corresponding recess, the head portions conforming to the curvature of the pin and collectively embracing it, and having beveled upper surfaces engageable by a drill stem threaded on the pin, the blades each having a planar face on its leading side, as determined by the direction of rotation of the bit, aligned with the longitudinal axis of the body member, the trailing side of each blade generally parallel to its leading side, the blades each having straight, vertically disposed inner and outer edges for at least a portion of its length, beginning at its lower end, the trailing side of each blade being continuous with said inner and outer edge portions, the lower end of each blade having a series of radially and longitudinally offset portions, each having a straight, horizontally disposed lower edge, whereby the blade is progressively shortened and widened, stepwise, beginning at its inner edge, the trailing side of each blade being continuous with said lower edge portions, and the blades each having a plurality of hardened metal inserts secured in recesses therefor in the leading edges of its offset end portions and constituting its cutting surfaces.

References Cited in the file of this patent

UNITED STATES PATENTS

| | | |
|---|---|---|
| 2,498,251 | Creel | Feb. 21, 1950 |
| 2,656,153 | White | Oct. 20, 1953 |
| 2,830,794 | Mills | Apr. 15, 1958 |
| 2,855,181 | Olsen | Oct. 7, 1958 |
| 2,859,942 | Hawthorne | Nov. 11, 1958 |
| 2,861,779 | White | Nov. 25, 1958 |